(12) United States Patent
Arava et al.

(10) Patent No.: US 8,918,101 B2
(45) Date of Patent: Dec. 23, 2014

(54) APPARATUS AND METHOD FOR CONTROLLING ACCESS TO DUAL STACK ARCHITECTURE USING ATTENTION (AT) COMMANDS

(75) Inventors: Uday Kumar Arava, Andhra Pradesh (IN); Simi Anand Sathy, Andhra Pradesh (IN); Nagarjuna Reddy Chaganti, Andhra Pradesh (IN); Bhavik Kirit Shah, Andhra Pradesh (IN)

(73) Assignee: Qualcomm Incorporated, San Diego, CA (US)

( * ) Notice: Subject to any disclaimer, the term of this patent is extended or adjusted under 35 U.S.C. 154(b) by 417 days.

(21) Appl. No.: 13/049,680

(22) Filed: Mar. 16, 2011

(65) Prior Publication Data

US 2012/0238270 A1    Sep. 20, 2012

(51) Int. Cl.
*H04W 4/00* (2009.01)
*H04W 8/18* (2009.01)
*H04W 48/18* (2009.01)
*H04W 88/06* (2009.01)

(52) U.S. Cl.
CPC .............. *H04W 8/183* (2013.01); *H04W 48/18* (2013.01); *H04W 88/06* (2013.01)
USPC ........ 455/435.2; 455/419; 455/420; 455/436; 455/444; 455/558; 455/550.1; 370/331; 370/328; 370/338; 370/467

(58) Field of Classification Search
CPC ...... H04W 48/18; H04W 88/06; H04W 8/183
USPC .............. 455/558, 419, 420, 418, 552.1, 557, 455/439, 423, 553.1, 411, 412.1–412.2, 455/414.1, 435.1–453, 67.11, 550.1, 556.2; 370/331, 252, 310.2, 469, 342, 313, 370/330, 328, 38, 466, 467; 379/418, 379/357.01–357.02, 211.05, 433.09; 719/328, 315, 314, 329, 318
See application file for complete search history.

(56) References Cited

U.S. PATENT DOCUMENTS

| 5,428,671 A | 6/1995 | Dykes et al. |
| 2006/0222009 A1 | 10/2006 | Yao et al. |

(Continued)

FOREIGN PATENT DOCUMENTS

| JP | 2008236346 A | 10/2008 |
| JP | 2008271121 A | 11/2008 |

(Continued)

OTHER PUBLICATIONS

"3rd Generation Partnership Project; Technical Specification Group Core Network and Terminals; AT command set for User Equipment (UE) (Release 10)" 3GPP Standard; 3GPP TS 27.007, 3rd Generation Partnership Project (3GPP), Mobile Competence Centre ; 650, Route Des Lucioles ; F-06921 Sophia-Antipolis Cedex ; France, No. V10. 2.0, Dec. 19, 2010, pp. 1-243, XP050462319, [retrieved on Dec. 19, 2010] .

(Continued)

*Primary Examiner* — Babar Sarwar
(74) *Attorney, Agent, or Firm* — Abdollah Katbab

(57) ABSTRACT

An apparatus and method for controlling access to a dual stack architecture using attention (AT) commands including establishing a first subscription to a first network; establishing a second subscription to a second network; selecting a desired subscription from the first subscription and second subscription; and sending an attention (AT) command to direct at least one of a plurality of existing attention (AT) commands towards the desired subscription.

43 Claims, 6 Drawing Sheets

(56) References Cited

U.S. PATENT DOCUMENTS

| | | | |
|---|---|---|---|
| 2007/0123277 A1* | 5/2007 | Harris et al. | 455/466 |
| 2008/0152126 A1* | 6/2008 | Pitkamaki et al. | 379/418 |
| 2010/0240414 A1 | 9/2010 | Lotenberg | |
| 2011/0117963 A1* | 5/2011 | Wang et al. | 455/558 |

FOREIGN PATENT DOCUMENTS

| | | |
|---|---|---|
| JP | 2011501913 A | 1/2011 |
| JP | 2012504358 A | 2/2012 |
| WO | 2009051377 A1 | 4/2009 |
| WO | 2010034377 A1 | 4/2010 |

OTHER PUBLICATIONS

International Search Report and Written Opinion—PCT/US2012/029536—ISA/EPO—Jun. 8, 2012.

"Data Transmission Systems and Equipment Serial Asynchronous Automatic Dialing and Control Character Mode DCE on Wireless Data Services; TIA/EIA-678", ANSI/TIA/EIA-678, XX, XX, Apr. 23, 1999, pp. 1-82, XP002285117.

Dual Sim Feature Support, "Texas Instruments Design Document", Jan. 2, 2005,[Jul. 31, 2014 searched], Retreived from the Internet: http:/scottn.us/downloads/peek/SW%20doc/PSL1DOC/5.24-g23mdoc/lld/aci/dual_sim_design.doc, pp. 1-19.

* cited by examiner

APPARATUS AND METHOD FOR CONTROLLING ACCESS TO DUAL STACK ARCHITECTURE USING ATTENTION (AT) COMMANDS

FIELD

This disclosure relates generally to apparatus and methods for controlling wireless access in a wireless communication system. More particularly, the disclosure relates to apparatus and method for controlling wireless access in a dual stack architecture using attention (AT) commands.

BACKGROUND

In many telecommunication systems, communications networks are used to exchange messages among several interacting spatially-separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and may be favored for interconnection of fixed network elements or for bulk data transfer. For example, fiber optic cables may be the preferred transmission media for very high throughput transport applications over long distances between large network hubs, such as, bulk data transport across or between continents over the Earth's surface.

On the other hand, wireless networks may be preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks may have advantages of facilitating user mobility and rapid field deployment compared to fixed wired networks. However, usage of wireless propagation may require significant active resource management among the network users and high levels of mutual coordination and cooperation for compatible spectrum utilization.

In one example, wireless networks are compatible with various wireless protocols. Exemplary versions of wireless protocols include Universal Mobile Telecommunications System (UMTS), High Speed Downlink Packet Access (HSDPA), High Speed Uplink Packet Access (HSUPA), Long Tenn Evolution (LTE), etc. Wireless systems compliant with these protocols may be used for various communication services such as telephony, messaging, data transfer, emails, Internet access, audio broadcasts, video communications, etc.

These wireless systems may utilize an access node (AN), also known as base station (BS), Node B or eNodeB, to connect to an individual access terminal, also known as user equipment (UE) or user device, to fixed telecommunications infrastructure networks. In general, a radio coverage area is implemented using a plurality of Node Bs or eNodeBs using a cellular-based topological architecture to provide wireless access, also known as an air interface, to the UEs (e.g., user equipments or user devices). Examples of fixed telecommunications infrastructure networks include the public switched telephony network (PSTN), Internet, private data networks, etc. In one aspect, the Node Bs or eNodeBs may be connected to a Radio Network Controller (RNC) to facilitate the interconnection to the fixed telecommunications infrastructure networks.

SUMMARY

Disclosed is an apparatus and method for controlling wireless access in a dual stack architecture using attention (AT) commands. According to one aspect, a method for controlling access to a dual stack architecture using attention (AT) commands including establishing a first subscription to a first network; establishing a second subscription to a second network; selecting a desired subscription from the first subscription and second subscription; and sending an attention (AT) command to direct at least one of a plurality of existing attention (AT) commands towards the desired subscription.

According to another aspect, an apparatus for controlling access to a dual stack architecture using attention (AT) commands including means for establishing a first subscription to a first network; means for establishing a second subscription to a second network; means for selecting a desired subscription from the first subscription and second subscription; and means for sending an attention (AT) command to direct at least one of a plurality of existing attention (AT) commands towards the desired subscription.

According to another aspect, a user equipment comprising a processor and a memory, the memory containing program code executable by the processor for performing the following: establishing a first subscription to a first network; establishing a second subscription to a second network; selecting a desired subscription from the first subscription and second subscription; and sending an attention (AT) command to direct at least one of a plurality of existing attention (AT) commands towards the desired subscription.

According to another aspect, a computer program product, including a non-transitory computer-readable medium including: codes for causing a computer to establish a first subscription to a first network; codes for causing a computer to establish a second subscription to a second network; codes for causing a computer to select a desired subscription from the first subscription and second subscription; and codes for causing a computer to send an attention (AT) command to direct at least one of a plurality of existing attention (AT) commands towards the desired subscription.

Advantages of the present disclosure may include facilitating access to separate wireless systems while maintaining backward compatibility with legacy commands.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
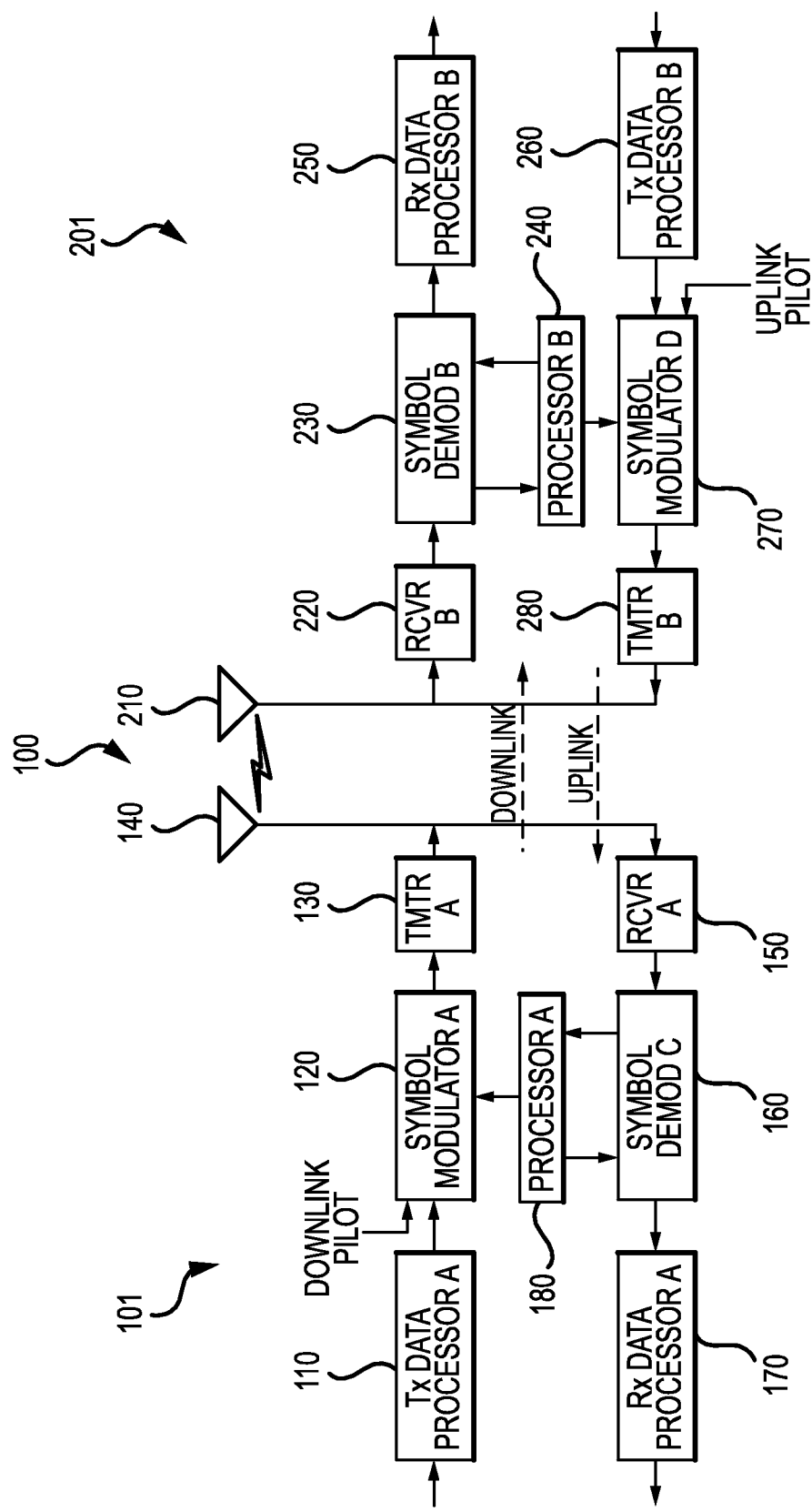
FIG. 1 is a block diagram illustrating an example of a two terminal system

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, Time Division Synchronous Code Division Multiple Access (TD-SCDMA) etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and TD-SCDMA Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, TD-SCDMA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 is a block diagram illustrating an example of a two terminal system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment, a TD-SCDMA environment or any other suitable wireless environment.

The access node/UE system 100 includes an access node 101 (e.g., base station) and a user equipment or UE 201 (e.g., wireless communication device). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), time division synchronous code division multiple access (TD-SCDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
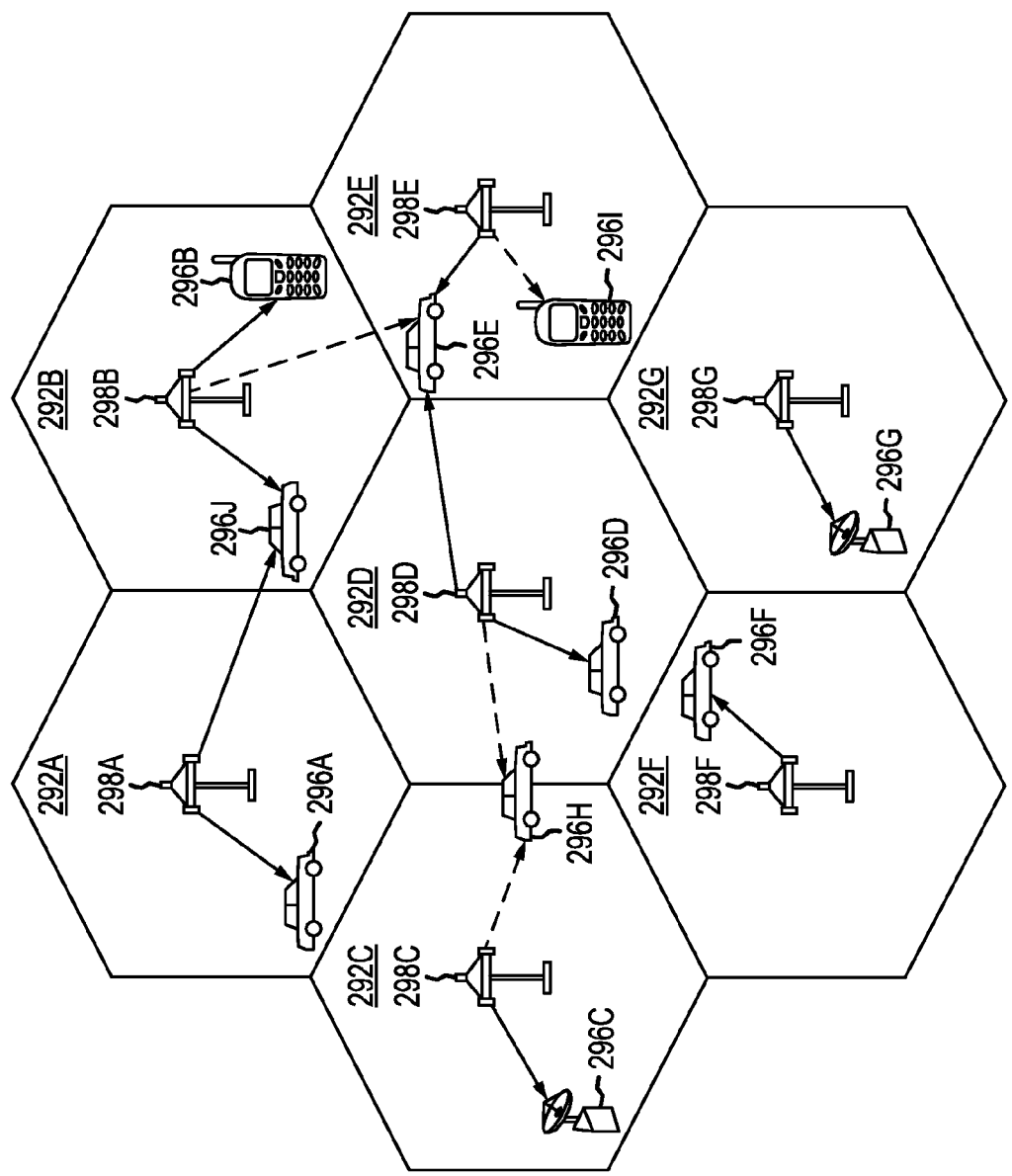
FIG. 2 illustrates an example of a wireless communications system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS) or node Bs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In one aspect, for a dual subscriber identity module (SIM) dual stack architecture in a wireless system, two registrations to two different wireless networks may be allowed. In one example, the dual stack architecture emulates having two different modems allowing for two different network registrations. For example, a first stack could be registered to a first wireless network, e.g. GSM, and a second stack could be registered to a second wireless network, e.g. UMTS. Under the current 3GPP technical specification 27.007, there are no options for an attention (AT) command for providing a stack parameter to access a particular stack. For example, in the case of a voice call, there may be no indication of stack which should handle a voice call. In one aspect, handling a voice call includes originating a voice call. Even if there were a default voice call option, there may still be no option for a user to choose another stack to handle the voice call. In another example, any command which goes over a stack to complete its functionality would have to be provided a means to select the stack. In addition, if there is an incoming voice call, the user may need to know from which network the call is received. This feature is not part of the current 3GPP technical specifications. In general, there may be many commands which need stack selection criteria which are not covered by current specifications.

In another aspect, to provide a user a choice or option to choose the stack or the network or to allow the SIM to access either of two stacks, a new attention (AT) command may be introduced. In one example, the attention (AT) command is designed in a way that does not affect other existing AT commands but allows existing attention (AT) commands to work according to user requirements. For example, $QCPSI-MAPP is a command named after a SIM application.

In one aspect, the execute command sets a user preference of the SIM application which is the setting of a provision. In one aspect, this command directs all commands to be routed to a desired SIM and a desired subscription. In one example, the execute command is similar to a switch which opens up commands to go to one stack and may be changed to point to another stack dynamically. This feature ensures the user may send any command onto any stack. In one example, this feature acts as a global setting and as an attach command processor (ATCoP) engine for all mobile origination (MO) operations. In another example, this feature may be relied upon to make a decision. For mobile terminated (MT) operations, based on the event details, the execute command may add extra information about the stack. In another aspect, a read command returns a currently set preference such that the user may know at any time current settings. In another aspect, a test command provides an available range to provide the input parameters in the execute command.

In one aspect, the attention (AT) commands do not have extra parameters defined in the current standards. In one example, for a dual SIM dual stack environment, the modem interface to the external world is a single interface, so an option is needed for the user to direct each command to one of a plurality of stacks. In one example, a command may be directed to a given stack to get executed. In one aspect, not all attention (AT) commands need the dual behavior. There is a need to identify the command which would need the dual behavior and to provision it to be used in two different stacks independent of each other. In addition clear notifications and extra information may be conveyed through response codes, for example, to avoid confusion to the user. In one aspect, use cases may require a clear separation of commands and their behavior.

For example, a user may desire to set the SMS storage to be SIM memory for a first message subscription and to be PHONE MEMORY for a second message subscription. At present, only one command exists, e.g. +CPMS command, which has no arguments (e.g. parameters) to suggest how it should behave on each subscription.

In one aspect, an extension to an existing modem command set is disclosed which uses the $QCPSIMAPP command based on how a +CPMS command is routed to a subscription. For example, when there is a Mobile Terminated (MT) voice call on one subscription, there is a need for indicating the correct subscription. In one aspect, the +CPMS command specifies a preferred message storage.

In one example, a dual SIM dual stack architecture emulates having two different modems having two different SIMs for network registration. In one aspect, usage of an existing attention (AT) command may result in ambiguity. A solution is needed which transforms an attention command processor (ATCoP) engine into a dual engine supporting a dual SIM dual stack architecture.

In one aspect, attention (AT) commands are attention (AT) commands to a modem. In one aspect, wireless standards 3GPP 27.007 and 3GPP 27.007, ITUT-V25ter define existing attention (AT) commands. In one example, there is a command to tune the modem; that is, store data, retrieve data, make a voice call, make a data call, or send an SMS command, etc. In one aspect, attention (AT) commands may be used to interact with the modem. For example, if a mobile phone or UE is connected to a personal computer (PC) using a serial communication link such as universal asynchronous receiver/transmitter (UART) or universal serial bus (USB), the UE is emulated as a modem. The attention (AT) commands may be sent to the modem through the serial communication link. For example, applications such as Hyper Terminal available in Windows OS can be used to send the commands.

In one example, an attention (AT) command processor maintains a single global state. For example, a command CSCS (Command name in text: Select terminal equipment Character Set) may be used to set a character set. In one example, this state is saved and used whenever applicable. In one aspect, a global state of an AT command is important across the modem life.

In another example, the modem is synchronous with a Subscriber identity Module (SIM). For example, the SIM may include key information for registration and network authentication. In one example, network operators embed user information, authentication, etc. which would be valid only to that network and to others according to a provision.

A complete modem stack may rely on provision information in the SIM and may perform registration and search according to a protocol. In one aspect, attention (AT) commands actively listen to the network registration status and other key events on the stack and set up a global state to guide the commands being issued for their behavior and functionality.

In one aspect, attention (AT) command operations can also be categorized as Mobile Originated (MO) and Mobile Terminated (MT). In one example, most of the MT operations would result in an unsolicited result code (URC), which must be sent directly to the terminal without issuance of any command. In the case of a single modem, there is no need or requirement to specify a desired stack for this URC as there is only a single modem.

In another aspect, commands which are related to, for example, a stack or a subscription, should have a separate configuration and behavior per a user setting. In another aspect, there should not be any overlap of commands. For example, using the command Set CREG (command registration) to obtain an unsolicited response on a first stack, there may not be any URC from a second stack as the second stack is not set.

In another aspect, a dual SIM dual stack architecture has a single modem which can register to one or two wireless networks at the same time. For example, a user may choose a network for a voice call or for a short message service (SMS). In one aspect, separate subscription information may be required to register to two different wireless networks, which requires two or more SIM cards. In one example, there are enhanced SIMs available which could have more than one application which may be used to register to a different wireless network.

In one aspect, since attention (AT) commands are command-driven, there is a need for a command which could guide the other commands issued to a specific stack. For example, a switch may be available for commands executed on a stack or to receive events from the stack. For example, when sent to a terminal as an URC, received data will have extra information added to the legacy URC to convey the stack details. In another aspect, a dual SIM dual stack (DSDS) modem may enhance the ATCoP to sustain the dual stack. In one example, for a single modem and single subscription, the MO or MT operations do not need extra information. In another example, when there is a DSDS modem, there may be a requirement to convey which stack is sending the command. In one aspect, the implementation should appear as if there are two physically different modems tied together with two different ATCoP engines.

In another aspect, if a user desires to make a call using an ATD (Attention: dial) command, for example, using ATD934858105 to make a call, a decision is needed regarding which SIM and which subscription to be used for the voice call when there are two SIMs. In one example, a User Interface may include a radio button to choose the SIM, or subscription, etc. However, in some systems, there is no option in the command to implement, for example, ATD9348581052;,<sub1> to convey to the ATCoP engine to make a call using sub1. One way to implement this option would require rewriting the 27.007 specification, which is undesirable.

In another aspect, there are set of commands which are not affected by this DSDS architecture. For example, some common commands, such as S-Register commands S3 (i.e., terminating character) do not have to be different for two different stacks. These commands continue to be single and are used across both the stacks.

In another aspect, unsolicited result codes (URCs) must be accommodated to convey the correct information about the stack. If a first stack with a first subscription receives an MT call and if only a RING command is shown on the terminal, the user may not know the association between this call and a SIM. In one example, there should be additional information shown along with the legacy URC, e.g., RING <Sub1>.

A new attention (AT) command may be used to specify a mode, subscription, stack, etc. for the ATCoP. In one aspect, this new attention (AT) command ensures that all further commands are routed to the correct stack and the actions of all MO operations are dependent on this new attention (AT) command. In another aspect, for all MT operations, all events are processed and ATCoP states are updated accordingly. And, while sending the URC to a terminal, whenever applicable or needed, extra information of the stack details may be conveyed.

In one aspect, a new attention (AT) command is used to choose an option to identify which phone book to access across different applications and SIM. In one example, the new attention (AT) command does not affect the other existing attention (AT) commands but guides the existing attention (AT) commands to work as per user requirements.

In another aspect, $QCPSIMAPP is the command named after SIM Application. The syntax of the command is as shown in Table 1:

TABLE 1

| Command | Possible Response(s) |
|---|---|
| $QCPSIMAPP =<SIM App> | OK |
|  | ERROR |
| $QCPSIMAPP? | $QCPSIMAPP:<SIM App> |
| $QCPSIMAPP=? | $QCPSIMAPP:(SIM App range) |

In another aspect, the syntax of the command follows the format:
$QCPSIMAPP=<SIM App>
<SIM App>:
0—Primary
1—Secondary
<SIM App range>: (0-1).

In one aspect, a new attention (AT) command may be used to choose an option for identification. For example, an execute command sets a user preference of the SIM Application which is the setting of the provision. This feature directs all commands to be routed to the right SIM and subscription. In one example, this command functions like a switch to open up commands to go to one stack and may be changed to point to the other stack dynamically. As a result, a user may send any command onto any stack.

In one aspect, similar to a global setting and an ATCoP engine for all the MO operations, the new attention (AT) command is used for a decision. In another aspect, for MT operations, based on the event details, the new attention (AT) command adds extra information about the stack.

In one example, a read command returns the currently set preference. This may be required for the user to know the current settings at any point in time. In another example, a test command provides the available range to provide the input parameters in the execute command.

In one aspect, when there is a MT voice call on a second subscription, the second subscription information may be conveyed on the mobile terminal However, in one example, the legacy code is RING without two separate codes for two subscriptions, for example, RING1 and RING2. In one aspect usage of two separate codes, for example, RING1 and RING2, may not be accepted by the wireless system. In one example, subscription information may be conveyed while keeping the legacy code intact. For example, a new command format could follow: RING <, Subs info>.

Figure 3:
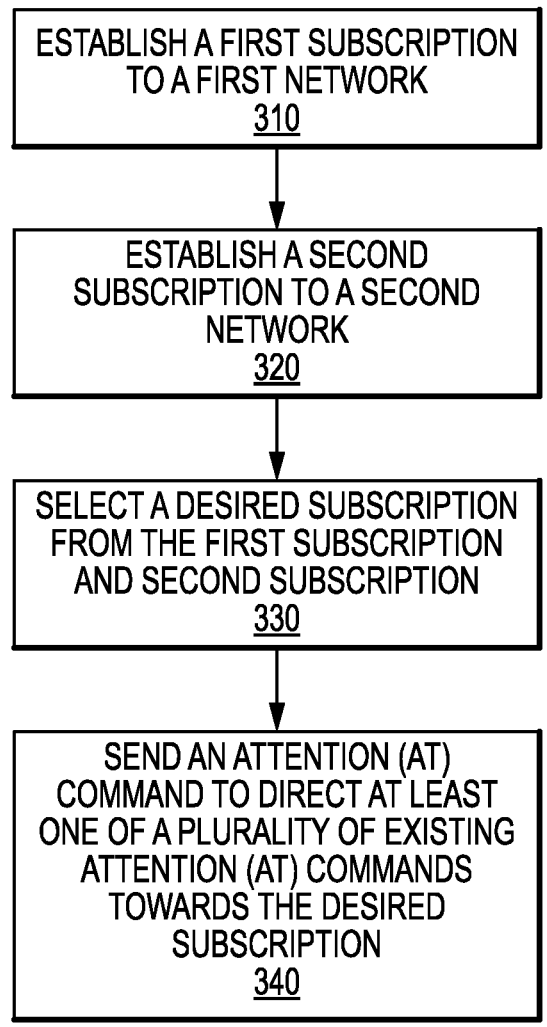
FIG. 3 illustrates an example of a flow diagram for controlling access to a dual stack architecture using attention (AT) commands.

FIG. 3 illustrates an example of a flow diagram for controlling access to a dual stack architecture using attention (AT) commands. In block 310, establish a first subscription to a first network.

Following block 310, in block 320, establish a second subscription to a second network. In one example, the first network is based on GSM. In another example, the second network is based on UMTS. In another example, the first or second network is based on LTE. In one example, the first subscription is used for a voice call and the second subscription is used for a short message service (SMS).

In block 330, select a desired subscription from the first subscription and second subscription. In one example, the desired subscription uses an ATD (Attention: Dial) command to make a voice call.

In block 340, send an attention (AT) command to direct at least one of a plurality of existing attention (AT) commands towards the desired subscription. In one example, the attention (AT) command is based on a $QCSIMAPP command. In another example, the attention (AT) command includes a <SIM App> field wherein the <SIM App> field may designate the desired subscription. In one example, the AT command is applied to mobile origination (MO) operations. In another example, the AT command is applied to mobile termination (MT) operations. In one example, the $QCSIMAPP command is based on how a +CPMS command is routed to either the first or second subscription. In another example, the +CPMS command specifies a preferred message storage. In one example, the AT command may be used to specify a mode, a subscription, or a stack for a command processor engine. In another example, the $QCSIMAPP command specifies a SIM application. In another example, the AT command is used to choose an option for identification. In another example, the AT command is used for a decision or adds extra information about a stack. In another example, the AT command uses a legacy code for a RING code with subscription information.

Figure 4:
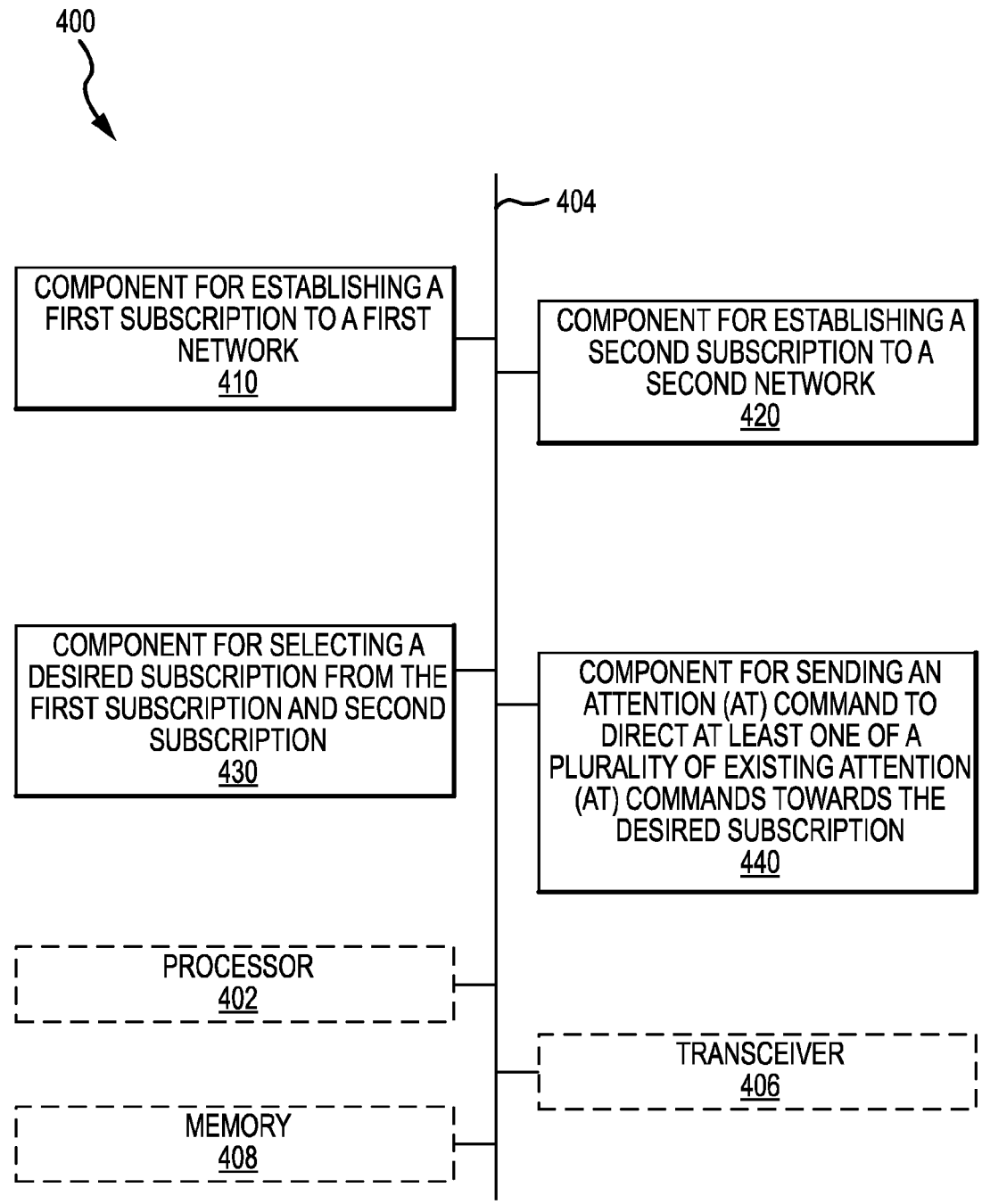
FIG. 4 illustrates an example device for controlling access to a dual stack architecture using attention (AT) commands.

FIG. 4 illustrates an example device 400 for controlling access to a dual stack architecture using attention (AT) commands. The device 400 may be configured as a communication device or as a processor or similar device for use within the communication device. As depicted, device 400 may include functional blocks that can represent functions implemented by a processor, software, hardware or combination thereof (e.g., firmware).

As illustrated, device 400 may include an electrical component 410 for establishing a first subscription to a first network. The device 400 may include an electrical component 420 for establishing a second subscription to a second network. The device 400 may include an electrical component 430 for selecting a desired subscription from the first subscription and second subscription. The device 400 may include an electrical component 440 for sending an attention (AT) command to direct at least one of a plurality of existing attention (AT) commands towards the desired subscription.

Device 400 may optionally include a processor module 402 having at least one processor. In one aspect, device 400 may be configured as a communication network entity, rather than as a processor. Processor 402, in such case, may be in operative communication with electrical components 410-440 via a bus 404 or a similar communication coupling. Processor 402 may effect initiation and scheduling of the processes or functions performed by electrical components 410-440.

In related aspects, device 400 may include a transceiver module 406. A stand-alone receiver and/or stand-alone transmitter may be used in lieu of or in conjunction with transceiver module 406. In further related aspects, device 400 may optionally include a module for storing information, such as, for example, a memory module 408. The memory module 408 may comprise a computer readable medium and may be operatively coupled to the other components of device 400 via a bus 404 or the like. The memory module 408 may be adapted to store computer readable codes, instructions and/or data for effecting the processes and behavior of electrical components 410-440, and subcomponents thereof, or processor 402, or the methods disclosed herein. Memory module 408 may retain codes/instructions for executing functions associated with electrical components 410-440. While shown as being external to memory module 408, it is to be understood that electrical components 410-440 may exist within memory module 408.

In block 340, send an attention (AT) command to direct at least one of a plurality of existing attention (AT) commands towards the desired subscription. In one example, the attention (AT) command is based on a $QCSIMAPP command. In another example, the attention (AT) command includes a <SIM App> field wherein the <SIM App> field may designate the desired subscription. In one example, the AT command is applied to mobile origination (MO) operations. In another example, the AT command is applied to mobile termination (MT) operations. In one example, the $QCSIMAPP command is based on how a +CPMS command is routed to either the first or second subscription. In another example, the +CPMS command specifies a preferred message storage. In one example, the AT command may be used to specify a mode, a subscription, or a stack for a command processor engine. In another example, the $QCSIMAPP command specifies a SIM application. In another example, the AT command is used to choose an option for identification. In another example, the AT command is used for a decision or adds extra information about a stack. In another example, the AT command uses a legacy code for a RING code with subscription information.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
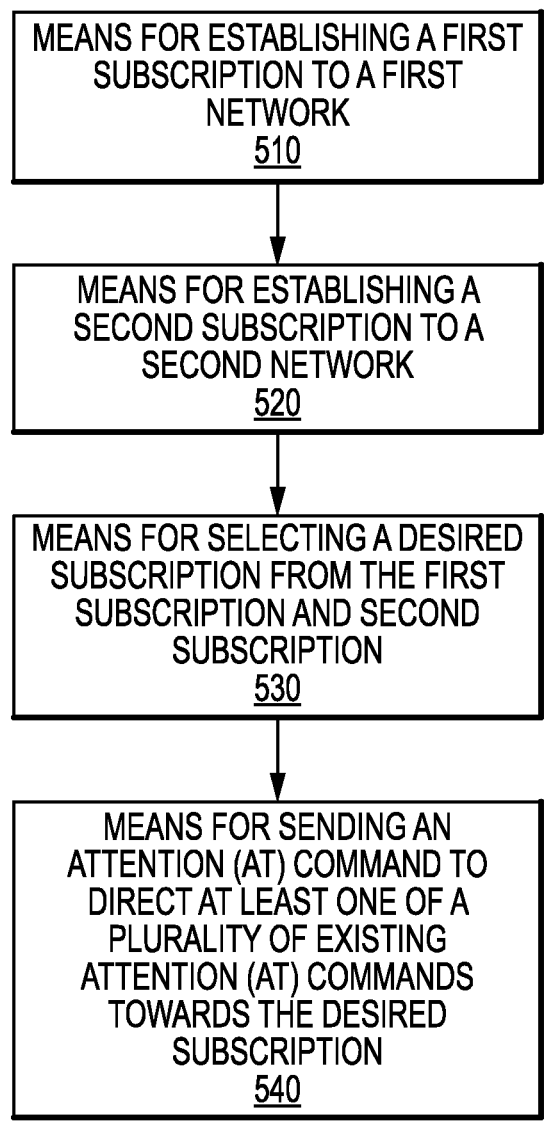
FIG. 5 illustrates an example of a device suitable for controlling access to a dual stack architecture using attention (AT) commands.

FIG. 5 illustrates an example of a device 500 suitable for controlling access to a dual stack architecture using attention (AT) commands. In one aspect, the device 500 is implemented by at least one processor comprising one or more modules configured to provide different aspects of controlling access to a dual stack architecture using attention (AT) commands as described herein in blocks 510, 520, 530 and 540. For example, each module comprises hardware, firmware, software, or any combination thereof. In one aspect, the device 500 is also implemented by at least one memory in communication with the at least one processor.

Figure 6:
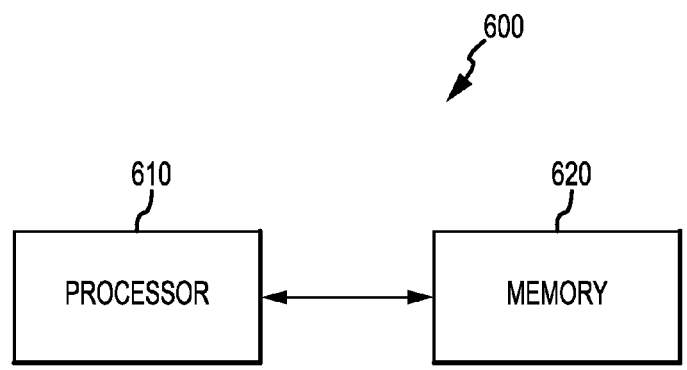
FIG. 6 illustrates an example of a device comprising a processor in communication with a memory for executing the processes for controlling access to a dual stack architecture using attention (AT) commands.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 600 comprising a processor 610 in communication with a memory 620 for executing the processes for controlling access to a dual stack architecture using attention (AT) commands. In one example, the device 600 is used to implement the algorithm illustrated in FIG. 3. In one aspect, the memory 620 is located within the processor 610. In another aspect, the memory 620 is external to the processor 610. In one aspect, the processor includes circuitry for implementing or performing the various flow diagrams, logical blocks and/or modules described herein.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for controlling access to a dual stack architecture using attention (AT) commands comprising:
    establishing a first subscription to a first network;
    establishing a second subscription to a second network;
    selecting a desired subscription from the first subscription and second subscription; and
    sending an attention (AT) command to direct at least one of a plurality of other attention (AT) commands that do not contain a parameter indicating the desired subscription towards the desired subscription.

2. The method of claim 1 wherein the first network is based on Global System for Mobile Communications (GSM) and the second network is based on Universal Mobile Telecommunication System (UMTS).

3. The method of claim 2 wherein the first subscription is used for a voice call and the second subscription is used for a short message service (SMS).

4. The method of claim 1 wherein at least one of the first network or the second network is based on Long Term Evolution (LTE).

5. The method of claim 1 wherein the desired subscription uses an Attention Dial (ATD) command to make a voice call.

6. The method of claim 1 wherein the attention (AT) command is based on a Subscriber Identity Module (SIM) application command.

7. The method of claim 6 wherein the attention (AT) command includes a Subscriber Identity Module (SIM) Application <SIM App> field for designating the desired subscription.

8. The method of claim 6 wherein the SIM application command is based on how a +CPMS command is routed to either the first or second subscription.

9. The method of claim 8 wherein the +CPMS (command name in text: Preferred Message Storage) command specifies a preferred message storage.

10. The method of claim 6 wherein the SIM application command specifies a SIM application.

11. The method of claim 1 wherein the AT command is applied either to mobile origination (MO) operations or to mobile termination (MT) operations.

12. The method of claim 1 further comprising using the AT command to specify a mode, a subscription, or a stack for a command processor engine.

13. The method of claim 1 further comprising using the AT command to choose an option for identification or to add information about a stack.

14. The method of claim 1 wherein the AT command uses a legacy code for a RING code with subscription information.

15. An apparatus for controlling access to a dual stack architecture using attention (AT) commands comprising:
    means for establishing a first subscription to a first network;
    means for establishing a second subscription to a second network;
    means for selecting a desired subscription from the first subscription and the second subscription; and
    means for sending an attention (AT) command to direct at least one of a plurality of other attention (AT) commands that do not contain a parameter indicating the desired subscription towards the desired subscription.

16. The apparatus of claim 15 wherein the first network is based on GSM and the second network is based on UMTS.

17. The apparatus of claim 16 wherein the first subscription is used for a voice call and the second subscription is used for a short message service (SMS).

18. The apparatus of claim 15 wherein at least one of the first network or the second network is based on LTE.

19. The apparatus of claim 15 wherein the desired subscription uses an Attention Dial (ATD) command to make a voice call.

20. The apparatus of claim 15 wherein the attention (AT) command is based on a Subscriber Identity Module (SIM) application command.

21. The apparatus of claim 20 wherein the attention (AT) command includes a <SIM App> field for designating the desired subscription.

22. The apparatus of claim 20 wherein the SIM application command is based on how a +CPMS command is routed to either the first or second subscription.

23. The apparatus of claim 22 wherein the +CPMS command specifies a preferred message storage.

24. The apparatus of claim 20 wherein the SIM application command specifies a SIM application.

25. The apparatus of claim 15 wherein the AT command is applied either to mobile origination (MO) operations or to mobile termination (MT) operations.

26. The apparatus of claim 15 further comprising means for using the AT command to specify a mode, a subscription, or a stack for a command processor engine.

27. The apparatus of claim 15 further comprising means for using the AT command to choose an option for identification or to add information about a stack.

28. The apparatus of claim 15 wherein the AT command uses a legacy code for a RING code with subscription information.

29. A user equipment comprising a processor and a memory, the memory containing program code executable by the processor for performing the following:
    establishing a first subscription to a first network;
    establishing a second subscription to a second network;
    selecting a desired subscription from the first subscription and second subscription; and
    sending an attention (AT) command to direct at least one of a plurality of other attention (AT) commands that do not contain a parameter indicating the desired subscription towards the desired subscription.

30. The user equipment of claim 29 wherein the first network is based on GSM and the second network is based on UMTS.

31. The user equipment of claim 30 wherein the first subscription is used for a voice call and the second subscription is used for a short message service (SMS).

32. The user equipment of claim 29 wherein at least one of the first network or the second network is based on LTE.

33. The user equipment of claim 29 wherein the desired subscription uses an Attention Dial (ATD) command to make a voice call.

34. The user equipment of claim 29 wherein the attention (AT) command is based on Subscriber Identity Module (SIM) application command.

35. The user equipment of claim 34 wherein the attention (AT) command includes a <SIM App> field for designating the desired subscription.

36. The user equipment of claim 34 wherein the SIM application command is based on how a +CPMS command is routed to either the first or second subscription.

37. The user equipment of claim 36 wherein the +CPMS command specifies a preferred message storage.

38. The user equipment of claim 34 wherein the SIM application command specifies a SIM application.

39. The user equipment of claim 29 wherein the AT command is applied either to mobile origination (MO) operations or to mobile termination (MT) operations.

40. The user equipment of claim 29 wherein the memory further comprising program code for using the AT command to specify a mode, a subscription, or a stack for a command processor engine.

41. The user equipment of claim 29 wherein the memory further comprising program code for using the AT command to choose an option for identification or to add information about a stack.

42. The user equipment of claim 29 wherein the AT command uses a legacy code for a RING code with subscription information.

43. A computer program product, comprising:
a non-transitory computer-readable medium comprising:
    codes for causing a computer to establish a first subscription to a first network;
    codes for causing a computer to establish a second subscription to a second network;
    codes for causing a computer to select a desired subscription from the first subscription and second subscription; and
    codes for causing a computer to send an attention (AT) command to direct at least one of a plurality of other attention (AT) commands that do not contain a parameter indicating the desire subscription towards the desired subscription.

\* \* \* \* \*